United States Patent
Yakovleva et al.

(10) Patent No.: US 11,923,535 B2
(45) Date of Patent: Mar. 5, 2024

(54) FAST CHARGING PRE-LITHIATED SILICON ANODE

(71) Applicant: FMC Lithium USA Corp., Philadelphia, PA (US)

(72) Inventors: Marina Yakovleva, Gastonia, NC (US); Kenneth Brian Fitch, Cherryville, NC (US); Jian Xia, Belmont, NC (US)

(73) Assignee: Livent USA Corp., Philadelphia, PA (US)

(*) Notice: Subject to any disclaimer, the term of this patent is extended or adjusted under 35 U.S.C. 154(b) by 236 days.

(21) Appl. No.: 17/178,439

(22) Filed: Feb. 18, 2021

(65) Prior Publication Data

US 2021/0273220 A1    Sep. 2, 2021

Related U.S. Application Data

(60) Provisional application No. 62/978,475, filed on Feb. 19, 2020.

(51) Int. Cl.
| | | |
|---|---|---|
| *H01M 4/36* | (2006.01) | |
| *H01M 4/02* | (2006.01) | |
| *H01M 4/04* | (2006.01) | |
| *H01M 4/134* | (2010.01) | |
| *H01M 4/1395* | (2010.01) | |
| *H01M 4/38* | (2006.01) | |
| *H01M 4/62* | (2006.01) | |
| *H01M 10/0525* | (2010.01) | |
| *H01M 10/0562* | (2010.01) | |

(52) U.S. Cl.
CPC ......... *H01M 4/366* (2013.01); *H01M 4/0404* (2013.01); *H01M 4/134* (2013.01); *H01M 4/1395* (2013.01); *H01M 4/382* (2013.01); *H01M 4/386* (2013.01); *H01M 4/622* (2013.01); *H01M 10/0525* (2013.01); *H01M 10/0562* (2013.01); *H01M 2004/021* (2013.01); *H01M 2004/027* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 3,721,113 | A | 3/1973 | Hovespian |
| 4,502,903 | A | 3/1985 | Bruder |
| 4,948,635 | A | 8/1990 | Iwasaki |
| 5,318,600 | A | 6/1994 | Schlaikjer et al. |
| 5,494,518 | A | 2/1996 | Keane et al. |
| 5,567,474 | A | 10/1996 | Dover et al. |
| 5,976,403 | A | 11/1999 | Dover et al. |
| 6,232,014 | B1 | 5/2001 | Shiota et al. |
| 6,706,447 | B2 | 3/2004 | Gao et al. |
| 7,588,623 | B2 | 9/2009 | Dover et al. |
| 7,851,083 | B2 | 12/2010 | Zhu et al. |
| 7,906,233 | B2 | 3/2011 | Wang et al. |
| 7,914,930 | B2 | 3/2011 | Sato et al. |
| 8,021,496 | B2 | 9/2011 | Yakovleva et al. |
| 8,088,509 | B2 | 1/2012 | Shen et al. |
| 8,133,612 | B2 | 3/2012 | Zou et al. |
| 8,158,282 | B2 | 4/2012 | Zhamu et al. |
| 8,241,793 | B2 | 8/2012 | Zhamu et al. |
| 8,252,438 | B2 | 8/2012 | Han et al. |
| 8,276,695 | B2 | 10/2012 | Han et al. |
| 8,377,236 | B2 | 2/2013 | Yakovleva et al. |
| 8,778,522 | B2 | 7/2014 | Visco et al. |
| 8,980,477 | B2 | 3/2015 | Gao et al. |
| 9,385,397 | B2 | 7/2016 | Zhamu et al. |
| 9,437,370 | B2 | 9/2016 | Chen et al. |
| 9,515,321 | B2 | 12/2016 | Yang et al. |
| 9,627,908 | B2 | 4/2017 | Kaminsky et al. |
| 9,649,688 | B2 | 5/2017 | Wietelmann et al. |
| 9,666,850 | B2 | 5/2017 | Visco et al. |
| 9,711,297 | B2 | 7/2017 | Rman et al. |
| 9,755,241 | B2 | 9/2017 | Zhamu et al. |
| 9,780,358 | B2 | 10/2017 | Masarapu et al. |
| 9,837,659 | B2 | 12/2017 | Balogh et al. |
| 9,843,041 | B2 | 12/2017 | Lopez et al. |
| 9,893,379 | B2 | 2/2018 | Yi et al. |
| 9,923,195 | B2 | 3/2018 | Amiruddin et al. |
| 9,941,505 | B2 | 4/2018 | Shen et al. |

(Continued)

FOREIGN PATENT DOCUMENTS

| | | |
|---|---|---|
| CA | 3093431 | 9/2019 |
| CN | 104332657 B | 6/2016 |

(Continued)

OTHER PUBLICATIONS

Elastomers, available at https://www.tribonet.org/wiki/elastomers/, 2022 (Year: 2022).*
Office Action, JP 2021-500498, dated Dec. 9, 2021, 3 pages.
Office Action, JP 2021-500498, dated Dec. 9, 2021, 4 pages, English Translation.
Machine Translation of JP 2010-160984A.
Machine Translation of JP 2017-174805A.
Yakovleva, Office Action, U.S. Appl. No. 16/573,556, dated Jun. 22, 2022, 15 pages.
International Search Report/Written Opinion dated Jun. 26, 2109 in PCT/US2019/023376.
International Search Report/Written Opinion dated Jun. 24, 2019 in PCT/US2019/023383.

(Continued)

*Primary Examiner* — Anca Eoff
(74) *Attorney, Agent, or Firm* — Williams Mullen; F. Michael Sajovec

(57) ABSTRACT

A battery having a cathode and an anode with a three-dimensional porous framework. The anode includes an anode active material lithiated with a lithium source. The lithium particles from the lithium source are alloyed or intercalated with the anode active material during diffusion to form the three-dimensional porous framework. The porous framework provides reduced electrode deterioration due to volume expansion.

26 Claims, 3 Drawing Sheets

(56) References Cited

U.S. PATENT DOCUMENTS

| | | | |
|---|---|---|---|
| 10,879,527 | B2 | 12/2020 | Laramie et al. |
| 2004/0188880 | A1 | 9/2004 | Bauer et al. |
| 2005/0130043 | A1 | 6/2005 | Gao et al. |
| 2005/0239917 | A1 | 10/2005 | Nelson et al. |
| 2007/0190422 | A1* | 8/2007 | Morris ............. H01M 4/587 429/231.4 |
| 2008/0171260 | A1* | 7/2008 | Kim ............. H01M 50/325 429/82 |
| 2008/0274408 | A1 | 11/2008 | Jarvis |
| 2009/0035663 | A1 | 2/2009 | Yakovleva et al. |
| 2009/0305131 | A1* | 12/2009 | Kumar ............. H01M 4/386 252/182.1 |
| 2010/0170735 | A1* | 7/2010 | Nakamura ............. B60L 3/04 180/68.5 |
| 2011/0135810 | A1 | 6/2011 | Yakovleva et al. |
| 2012/0094188 | A1 | 4/2012 | Visco et al. |
| 2012/0164539 | A1* | 6/2012 | Zhamu ............. H01M 10/0525 429/300 |
| 2013/0157106 | A1 | 6/2013 | Lee et al. |
| 2014/0186519 | A1 | 7/2014 | Cobb |
| 2014/0342209 | A1 | 11/2014 | He et al. |
| 2015/0086869 | A1 | 3/2015 | Wang et al. |
| 2016/0028089 | A1 | 1/2016 | Arpin et al. |
| 2016/0301076 | A1 | 10/2016 | Shen et al. |
| 2016/0351893 | A1 | 12/2016 | Wietelmann et al. |
| 2017/0040605 | A1 | 2/2017 | Hwang et al. |
| 2017/0123443 | A1 | 5/2017 | Kronmueller et al. |
| 2017/0149052 | A1 | 5/2017 | Yakovleva et al. |
| 2017/0301485 | A1 | 10/2017 | Cao et al. |
| 2017/0365854 | A1 | 12/2017 | Gopalakrishnannair et al. |
| 2018/0013126 | A1 | 1/2018 | Ivanov et al. |
| 2018/0241079 | A1 | 8/2018 | Duong et al. |
| 2018/0269442 | A1 | 9/2018 | Hsieh |
| 2018/0269471 | A1 | 9/2018 | Lopez et al. |
| 2019/0214631 | A1* | 7/2019 | Fitch ............. H01M 10/0565 |
| 2019/0229380 | A1* | 7/2019 | Son ............. H01M 10/0569 |
| 2020/0083518 | A1* | 3/2020 | Yakovleva ............. H01M 4/62 |
| 2021/0273220 | A1 | 9/2021 | Yakovleva et al. |

FOREIGN PATENT DOCUMENTS

| | | |
|---|---|---|
| EP | 1352436 B1 | 10/2003 |
| EP | 4107800 | 12/2022 |
| JP | 2004349164 | 12/2004 |
| JP | 2008503865 | 11/2008 |
| JP | 2010-160984 A | 7/2010 |
| JP | 2010160982 A | 7/2010 |
| JP | 2013065532 A | 4/2013 |
| JP | 2013243088 A | 12/2013 |
| JP | 2014120264 A | 6/2014 |
| JP | 2014175080 A | 9/2014 |
| JP | 2016521907 | 7/2016 |
| JP | 2017-174805 A | 9/2017 |
| WO | 2011008744 | 1/2011 |
| WO | 2011008744 A1 | 1/2011 |
| WO | 2017123443 | 7/2017 |
| WO | 2018025036 | 2/2018 |
| WO | 2019183363 A1 | 9/2019 |
| WO | 2021168063 | 8/2021 |

OTHER PUBLICATIONS

International Search Report/Written Opinion dated Jun. 26, 2019 in PCT/US2019/023390.

Mashtalir et al., High-Purity Lithium Metal Film from Aqueous Mineral Solutions, American Chemical Society (ACS) Omega 2018, vol. 3 pp. 181-187.

International Preliminary Report on Patentability for International Application No. PCT/US2019/023390, dated Sep. 22, 2020.

International Preliminary Report on Patentability for International Application No. PCT/US2019/023376, dated Sep. 22, 2020.

International Preliminary Report on Patentability for International Application No. PCT/US2019/023383, dated Sep. 22, 2020.

Office Action, U.S. Appl. No. 16/573,587, 10 pages, dated Oct. 4, 2021.

International Report on Preliminary Patentability, PCT/US2019/051705, 9 pages, dated Sep. 16, 2021.

Japanese Patent Office, Office Action, JP Application No. 2021-500495, dated Dec. 16, 2022.

Intellectual Property Office Singapore, Office Action, SG Patent Application No. 11202108855W, dated Nov. 2, 2022.

Intellectual Property Office Singapore, Office Action, SG Patent Application No. 11202108854X, dated Nov. 2, 2022.

International Search Report and Written Opinion of the International Searching Authority dated Apr. 6, 2021 in PCT/US2021/018495.

Office Action, JP 2021-500496, dated Dec. 12, 2021, 4 pages, English translation.

JP 2010-160982A, dated Jul. 22, 2010, Tanizaki Hiroaki et al., Machine translation.

JP 2013-065532A, dated Apr. 11, 2013, Teraki Kuniko et al., Machine translation.

JP 2013-243088A, dated Dec. 5, 2013, Shimoizumi Jun et al., Machine translation.

JP 2014-120264A, dated Jun. 30, 2014, Nakajima Mamoru et al., Machine translation.

JP 2014-175080A, dated Sep. 22, 2014, Shishihara Daisuke et al., Machine translation.

First Examination Report of Indian Patent Application No. 202137045734, dated Oct. 25, 2022.

European Patent Office, Written Opinion of the ISR for International Patent Application No. PCT/US2021/018495.

Canadian Patent Office, Examination Search Report for Application No. 3,166,124, dated Jun. 21, 2023.

\* cited by examiner

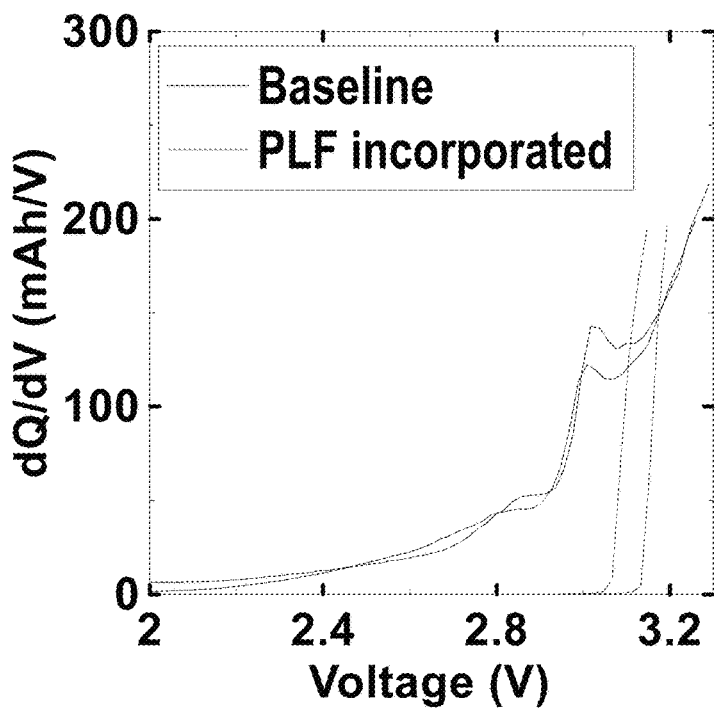
FIG. 4
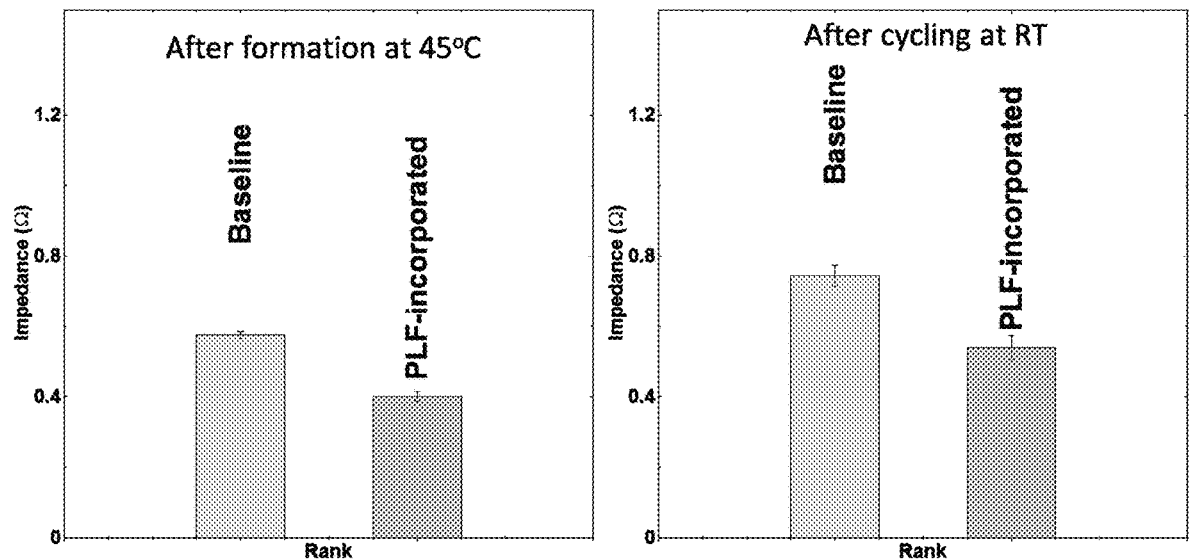
FIG. 5A
FIG. 5B

FAST CHARGING PRE-LITHIATED SILICON ANODE

RELATED APPLICATION

The following application claims priority to U.S. Provisional No. 62/978,475, filed Feb. 19, 2020, the disclosure of which is incorporated by reference in its entirety.

FIELD OF THE INVENTION

The present invention relates to a battery with a cathode and a porous anode having improved lithium diffusion kinetics and surface conductivity.

BACKGROUND OF THE INVENTION

Lithium and lithium-ion secondary or rechargeable batteries have found use in certain applications such as in cellular phones, camcorders, and laptop computers, and even more recently, in larger power application such as in electric vehicles and hybrid electric vehicles. It is preferred in these applications that the secondary batteries have the highest specific capacity possible but still provide safe operating conditions and good cyclability so that the high specific capacity is maintained in subsequent recharging and discharging cycles.

Although there are various constructions for secondary batteries, each construction includes a positive electrode (or cathode), a negative electrode (or anode), a separator that separates the cathode and anode, an electrolyte in electrochemical communication with the cathode and anode. For secondary lithium batteries, lithium ions are transferred from the anode to the cathode through the electrolyte when the secondary battery is being discharged, i.e., used for its specific application. During the discharge process, electrons are collected from the anode and pass to the cathode through an external circuit. When the secondary battery is being charged, or recharged, the lithium ions are transferred from the cathode to the anode through the electrolyte.

New lithium-ion cells or batteries are initially in a discharged state. During the first charge of lithium-ion cell, lithium moves from the cathode material to the anode active material. The lithium moving from the cathode to the anode reacts with an electrolyte material at the surface of the graphite anode, causing the formation of a passivation film on the anode. The passivation film formed on the graphite anode is also called solid electrolyte interface (SEI). Upon subsequent discharge, the lithium consumed by the formation of the SEI is not returned to the cathode. This results in a lithium-ion cell having a smaller capacity compared to the initial charge capacity because some of the lithium has been consumed by the formation of the SEI. The partial consumption of the available lithium on the first cycle reduces the capacity of the lithium-ion cell. This phenomenon is called irreversible capacity and is known to consume about 10% to more than 20% of the capacity of a lithium ion cell. Thus, after the initial charge of a lithium-ion cell, the lithium-ion cell loses about 10% to more than 20% of its capacity.

One solution has been to use stabilized lithium metal powder to pre-lithiate the anode. For example, lithium powder can be stabilized by passivating the metal powder surface with carbon dioxide such as described in U.S. Pat. Nos. 5,567,474, 5,776,369, and 5,976,403, the disclosures of which are incorporated herein in their entireties by reference. The $CO_2$ passivated lithium metal powder can be used only in air with low moisture levels for a limited period of time before the lithium metal content decays because of the reaction of the lithium metal and air. Another solution is to apply a coating such as fluorine, wax, phosphorus or a polymer to the lithium metal powder such as described in U.S. Pat. Nos. 7,588,623, 8,021,496, 8,377,236 and U.S. Patent Publication No. 2017/0149052, for example. These coatings provide high stability to the lithium powder in a dry room environment.

When lithium foil is used for pre-lithiation and directly laminated to the surface of the electrode, as a result of "short circuit" lithiation due to the lamination pressure applied, potentially, significant heat might be generated. When this pre-lithiation technique is performed in a roll to roll process, heat might build up in the center of the roll and might be difficult to dissipate. This heat buildup can potentially lead to for example, mechanical damage of the electrode and more importantly, to potential thermal runaway.

Another known battery issue is lithium plating, which commonly occurs during fast charging when lithium deposits, called dendrites, accumulate on the electrode surface potentially leading to short circuiting and failure of the battery.

Silicon and silicon-containing anodes have been developed for decades because of their high theoretical charge capacity (4200 mA h/g). However, current silicon anodes may be hampered with various issues, for example high irreversible capacity and short cycle life due to issues with volume expansion. For example, as the silicon particles alloy with lithium, the particle volume may expand up to 400%.

Thus, there remains a need for a battery with lithiated or prelithiated components having improved safety and increased efficiency and capable of fast charging, and moreover, a battery with a silicon anode with mitigated volume expansion upon lithium alloying with silicon and mitigated irreversible capacity losses.

SUMMARY OF THE INVENTION

To this end, the present invention provides a battery having a cathode and a porous anode lithiated with a lithium powder, lithium particulates or a printable lithium formulation. The pores are formed, for example, by lithium diffusing from the printable lithium composition into an anode active material. A battery with a porous anode as described herein will have improved lithium diffusion kinetics and or gradient porosity leading to increased fast charging capability and improved low temperature performance.

In one embodiment, the anode active material is a silicon containing active material. The silicon active material is alloyed with lithium particles to form a three-dimensional porous framework in the anode having an increased electrode porosity and reduced electrode deterioration from volume expansion due to the buffering effect of the pores. A highly conductive porous layer may also be formed on a surface of the anode. The porous conductive surface layer and gradient porosity enables high rates of charging by effectively lowering the areal current density and by having increased conductivity and allowing for faster diffusion of lithium at the electrode surface and in the electrode bulk, thereby allowing thicker electrodes while decreasing the likelihood of lithium plating on the anode surface.

In one embodiment, the anode active material is selected from the group consisting a single or a combination including graphite, hard carbon, graphite-SiOx composite, SiOx, SiO, $SiO_2$, Si powder, Si film, SiC, Si/C composite, Si-based alloys, graphite-SnO, Sn/C composite, and other lithium ion battery and lithium ion capacitor anode materials.

The printable lithium formulation may be comprised of a lithium metal powder, a polymer binder compatible with the lithium metal powder, a rheology modifier compatible with the lithium metal powder, and a solvent compatible with the lithium metal powder and with the polymer material. The polymer material may form a polymer film on the surface of the electrode that acts as a lithiation control layer. The lithiation control layer may regulate lithium diffusion and slow the rate of dry state pre-lithiation that can occur during lamination of the lithium to the surface of the negative electrode and may subsequently allow for the dissipation of heat generation during storage of the electrode materials. By adding lithium ion conducting additives such as solid electrolyte salts including sulfides ($Li_{10}GeP_2S_{12}$, $Li_3PS_4$, $Li_2GeS_3$, $Li_4GeS_4$, $Li_2ZnGeS_4$), oxides ($Li_7La_3Zr_2O_{12}$, $Li_xLa_yTiO_3$), phosphates ($Na_3Zr_2PSi_2O_{12}$, $LiZr_2(PO_4)_3$, $Li_{1.3}Al_{0.3}Ti_{1.7}(PO_4)_3$, $Li_{1.5}Al_{0.5}Ge_{1.5}(PO_4)_3$, $LiGe_2(PO_4)_3$ as well as argyrodite-type electrolytes ($Li_6PS_5Cl$, $Li_6PS_5Br$ and $Li_6PS_5I$), the formed layer can also function as an artificial solid electrolyte interphase. The polymer can create a flexible, electronically insulating layer that can expand and contract with the silicon anode, maintaining integrity while allowing lithium ions to transfer across the layer.

By depositing the printable lithium as a thin stripe in the Y-plane as an alternating pattern between silicon anode stripes, the silicon anode material can expand in the X-plane alleviating electrochemical grinding and loss of particle electrical contact. Thus, the printing method can provide a buffer for expansion. In another example, where the printable lithium formulation is used to form the anode, it could be co-extruded in a layered fashion along with the cathode and separator, resulting in a solid-state battery.

BRIEF DESCRIPTION OF THE DRAWINGS

FIG. 4 is a plot comparing differential capacity (dQ/d V) versus potential (V) during first charge between baseline and cells treated with a printable lithium composition.

FIG. 5A is a plot showing AC impedance for baseline cells and cells treated with a printable lithium composition as measured after formation cycle.

FIG. 5B is a plot showing AC impedance for baseline cells and cells treated with a printable lithium composition after cycling at the end of cycle life (20% capacity loss).

DETAILED DESCRIPTION OF THE INVENTION

Figures 1A, 1B:
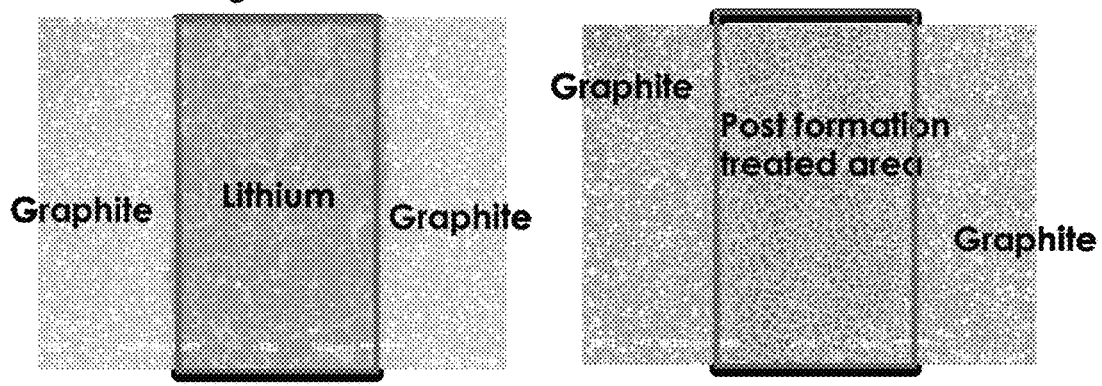
FIG. 1A is a SEM backscatter image of a graphite electrode containing 10% SiO treated using a printable lithium composition.
FIG. 1B is a SEM backscatter image of the graphite electrode containing 10% SiO after completion of the lithium diffusion.

The foregoing and other aspects of the present invention will now be described in more detail with respect to the description and methodologies provided herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise. Also, as used herein, "and/or" refers to and encompasses any and all possible combinations of one or more of the associated listed items.

The term "about," as used herein when referring to a measurable value such as an amount of a compound, dose, time, temperature, and the like, is meant to encompass variations of 20%, 10%, 5%, 1%, 0.5%, or even 0.1% of the specified amount. Unless otherwise defined, all terms, including technical and scientific terms used in the description, have the same meaning as commonly understood by one of ordinary skill in the art to which this invention belongs.

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of at least about 20% or more.

All patents, patent applications and publications referred to herein are incorporated by reference in their entirety. In case of a conflict in terminology, the present specification is controlling.

In accordance with the present invention, a battery comprising a cathode and a porous silicon anode lithiated with a lithium source is provided. In one embodiment, the anode is comprised of a silicon active material with carbon nanotubes. Examples of suitable lithium sources may include lithium powder, lithium particulates, lithium mesh or a printable lithium composition. As disclosed in U.S. application Ser. Nos. 16/359,707 and 16/573,587, which are hereby incorporated by reference in their entireties, the printable lithium composition comprises a lithium metal powder, a polymer binder, a rheology modifier and may further include a solvent. The polymer binder may be compatible with the lithium metal powder. The rheology modifier may be compatible with the lithium metal powder and the polymer binder. The solvent may be compatible with the lithium metal powder and with the polymer binder.

The silicon active material is lithiated with a lithium powder, lithium particulates or printable lithium composition to provide a silicon anode with pores throughout the electrode created by lithium, for example diffusing from the printable lithium formulation. In one embodiment, the porous silicon anode is formed by mixing the lithium powder, lithium particulates or printable lithium composition with a silicon active material in a slurry. The slurry may be coated onto a foil, mesh or foam. Solvent from the slurry is removed to form a dried anode, and the dried anode may then be pressed. Upon electrolyte addition, lithium intercalates or alloys with the negative electrode active material forming the porous silicon or silicon containing anode. The porous structure formed within the silicon anode mitigates volume expansion by providing a buffer to absorb the volume changes during subsequent electrochemical processing.

The silicon anode formed by the silicon active material and the printable lithium composition has a porosity that may range between about 25% and 60%. In one embodiment, the porosity of the silicon anode is between about 30% and 50%. The porosity of an electrode may increase between about 5 to 15% when the electrode active material is prelithiated with a lithium source.

For example, the porosity for a non-prelithiated electrode may be determined by first subtracting the actual electrode density from its theoretical density, then dividing by the theoretical density. The electrode's theoretical density is its true density for a perfect monolithic layer, but due to fraction of the volume of voids over the total volume, the actual density of an electrode will be lower than its theoretical density. Thus, subtracting the actual electrode density from its theoretical density indicates the electrode's amount of vacant space between particles, and dividing the electrode's vacant space by its theoretical density gives the electrode's % porosity. Prelithiating an electrode may affect the electrode's actual density and therefore its porosity. The actual density of a prelithiated electrode may be determined by first subtracting the contribution of lithium from the true density of each component to determine the electrode active material ratio and then multiplying the electrode active material's ratio by its actual density for a non-prelithiated electrode. This is based on the assumption that all lithium is intercalated into the host active material and that after diffusion, pores would be left where lithium particles once resided. The porosity of the prelithiated electrode is then calculated by subtracting its actual density from the theoretical density of a non-prelithiated electrode, then dividing by the theoretical density.

A porous conductive layer may also be formed on the surface of an anode during lithium diffusion. In one embodiment, the printable lithium formulation may be applied to a pre-fabricated silicon anode to create a porosity gradient electrode. The porosity of the lithium layer when the printable lithium composition is initially applied to the surface of a pre-fabricated surface may be expressed as:

$$\text{Porosity of Lithium Layer Before lithium Diffusion} = 1 - \frac{\text{Actual Density of Printable Lithium Composition}}{\text{Theoretical Density of Printable Lithium Composition}}$$

The theoretical density of a printable lithium composition is the sum of the true densities for each component multiplied by their respective mass percentages, wherein the total mass percentage is equal to one. The porosity of the lithium layer after diffusion into a pre-fabricated surface may be expressed as:

$$\text{Porosity of Lithium Layer After Diffusion} = 1 - \frac{\text{Actual Density of Printable Composition without Lithium}}{\substack{\text{Theoretical Density of Printable Lithium} \\ \text{Composition without Lithium Composition}}}$$

The theoretical density of the printable lithium composition without lithium may be determined by dividing the sum of mass percentages for every component except lithium by the total volume of the printable lithium composition initially applied to the electrode surface. This assumes that all lithium from the printable lithium composition has diffused into the electrode. Thus, surfaces treated with a printable lithium composition after lithium diffusion have a higher porosity than the bulk electrode. Moreover, the porosity at an electrode surface may be dependent on the amount of lithium deposited and diffused.

Additives in the printable lithium formulation also increase conductivity on the surface and bulk of the electrode. The resultant porous, conductive gradient structure enables high rates of charging by lowering the effective areal current density and increasing surface and bulk conductivity, allowing for faster diffusion of lithium ions at the electrode surface and in the electrode bulk, thereby decreasing the likelihood of lithium plating on the anode surface. The faster diffusion kinetics results in lower charge transfer impedance and provides better charge rate capabilities. For example, silicon anodes formed by silicon active material and a printable lithium composition may have an improvement in rate capability between about 5% and 30% at a 1 C charge rate and between about 20% and 50% at a 2 C charge rate compared to non-lithiated silicon anodes.

Figures 2A, 2B, 2C:
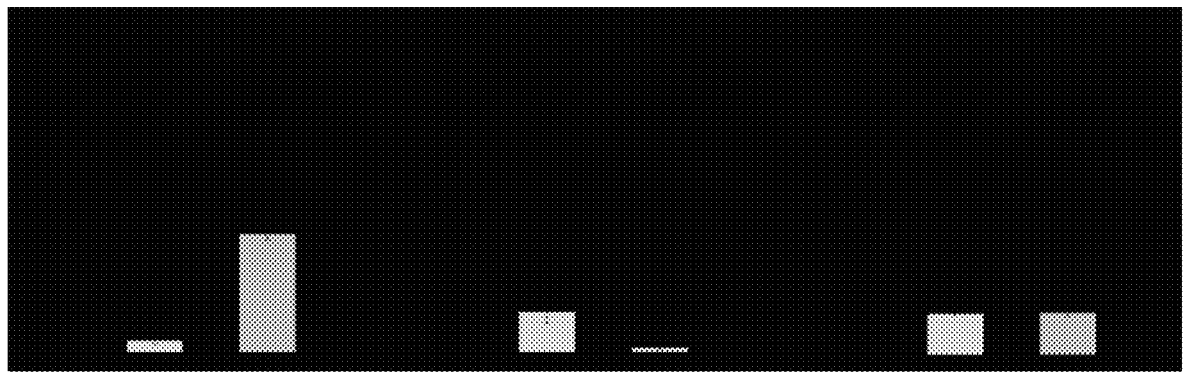
FIGS. 2A-C are plots comparing gas generation for baseline cells versus cells treated with a printable lithium composition under different conditions.
Figures 3A, 3B, 3C, 3D:
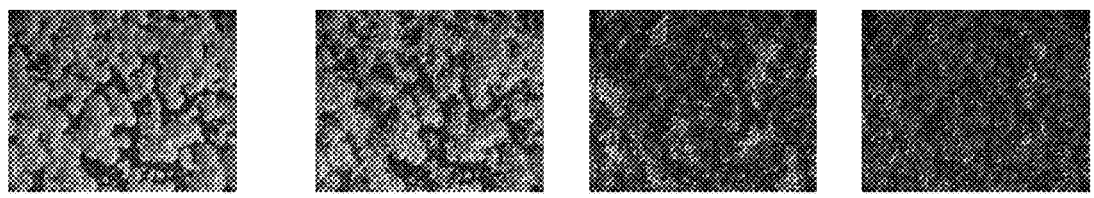
FIG. 3A is a reflected light microscopy image of a SiO electrode surface with SLMP initially deposited at its surface.
FIG. 3B is a reflected light microscopy image of a SiO electrode surface five minutes after SLMP is deposited at its surface.
FIG. 3C is a reflected light microscopy image of a SiO electrode surface fifteen minutes after SLMP is deposited at its surface.
FIG. 3D is a reflected light microscopy image of a SiO electrode surface twenty minutes after SLMP is deposited at its surface.
Figures 3E, 3F, 3G, 3H:
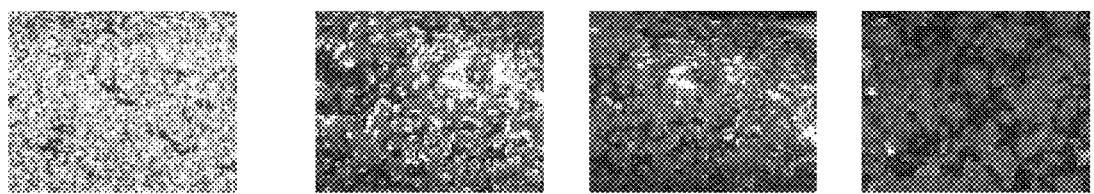
FIG. 3E is a reflected light microscopy image of a SiO electrode surface with a printable lithium composition initially deposited at its surface.
FIG. 3F is a reflected light microscopy image of a SiO electrode five hours surface after printable lithium composition is deposited at its surface.
FIG. 3G is a reflected light microscopy image of a SiO electrode surface fifteen hours after printable lithium composition is deposited at its surface.
FIG. 3H is a reflected light microscopy image of a SiO electrode surface twenty hours after printable lithium composition is deposited at its surface.

Standard rechargeable Li-ion batteries require a formation process which usually takes several days to form a robust solid electrolyte interface (SEI) layer on the surface anode materials. The formation processes slow Li-ion batteries production rates and requires larger facility footprint and significant investment in formation equipment as described by An et al. ("Fast formation cycling for lithium ion batteries", $J$ $Power$ $Sources$, 2017, 342, 846), incorporated herein by reference in its entirety. However, formation cycle time can be significantly decreased by prelithiating electrodes with a printable lithium composition. Typically, gas is generated during a standard SEI formation cycle due to solvent reduction during the formation of the SEI layer. Electrolyte solvents, such as ethylene carbonate, may be reduced on the graphite surface at 2.7 V (~0.9 V vs Li/Li$^+$), which is well below the open circuit voltage of the cells prelithiated with a printable lithium composition, typically at 2.9-3V. As a result, cells with electrodes prelithiated with a printable lithium composition may produce almost no gas during a typical SEI formation charging-discharging cycle. This is because the SEI layer is formed on electrodes prelithiated with a printable lithium composition during a rest period prior to a formation cycle. Therefore, a simplified and shorter formation cycle can be used. For example, the simplified formation process may only consist of a resting period of a few hours to up to 24 hours at room or elevated temperatures followed by a degassing process. FIG. 2A shows pouch cells with electrodes prelithiated with a printable lithium composition produce gas during the 24 hs rest. This gas can be removed by a degassing step prior to formation cycle. In comparison, baseline cells, which are not prelithiated, do not produce gas during the 24 hs rest. FIG. 2B shows baseline cells produced gas during the formation charging-discharging cycle while pouch cells with prelithiated electrodes produced no gas. FIG. 2C shows both baseline cells and cells containing printable lithium treated electrodes produce similar gas during long-term cycling. FIG. 3 shows cells with electrodes prelithiated with a printable lithium composition have no solvent reduction peaks at all during the formation cycle before 2.9 V. This is because pre-lithiation treatment results in partial charging of the cell beyond 2.9 V, which is beyond the voltage of solvent reduction. This is a further indication that pre-lithiation process initiate SEI formation.

In some embodiments, the lithium source for lithiating a silicon or silicon-containing anode is a lithium metal powder. The lithium metal powder may be in the form of a finely divided powder. The lithium metal powder typically has a mean particle size of less than about 80 microns, often less than about 40 microns and sometimes less than about 20 microns. The lithium metal powder may be non-pyrophoric stabilized lithium metal power (SLMP®) available from FMC USA Lithium Corp. The lithium metal powder may also include a substantially continuous layer or coating of fluorine, wax, phosphorus or a polymer or the combination thereof (as disclosed in U.S. Pat. Nos. 5,567,474, 5,776,369, and 5,976,403 and incorporated herein by reference in their entireties). Lithium metal powder has a significantly reduced reaction with moisture and air.

The lithium metal powder may also be alloyed with a metal. For example, the lithium metal powder may be alloyed with a Group I-VIII element. Suitable elements from Group IB may include, for example, silver or gold. Suitable elements from Group IIB may include, for example, zinc, cadmium, or mercury. Suitable elements from Group IIA of the Periodic Table may include beryllium, magnesium, calcium, strontium, barium, and radium. Elements from Group IIIA that may be used in the present invention may include, for example, boron, aluminum, gallium, indium, or thallium. Elements from Group IVA that may be used in the present invention may include, for example, carbon, silicon, germanium, tin, or lead. Elements from Group VA that may be used in the present invention may include, for example, nitrogen, phosphorus, or bismuth. Suitable elements from Group VIIIB may include, for example, palladium, or platinum.

In some embodiments, the lithium source is a printable lithium composition as described in U.S. application Ser. Nos. 16/359,707 and 16/573,587, which are incorporated herein by reference in their entireties. The printable lithium composition comprises a lithium metal powder, a polymer binder, a rheology modifier and may further include a solvent.

The polymer binder is selected so as to be compatible with the lithium metal powder. "Compatible with" or "compatibility" is intended to convey that the polymer binder does not violently react with the lithium metal powder resulting in a safety hazard. The lithium metal powder and the polymer binder may react to form a lithium-polymer complex, however, such complex should be stable at various temperatures. It is recognized that the amount (concentration) of lithium and polymer binder contribute to the stability and reactivity. The polymer binder may have a molecular weight of about 1,000 to about 8,000,000, and often has a molecular weight of 2,000,000 to 5,000,000. Suitable polymer binders may include one or more of poly(ethylene oxide), polystyrene, polyisobutylene, natural rubbers, butadiene rubbers, styrene-butadiene rubber, polyisoprene rubbers, butyl rubbers, hydrogenated nitrile butadiene rubbers, epichlorohydrin rubbers, acrylate rubbers, silicon rubbers, nitrile rubbers, polyacrylic acid, polyvinylidene chloride, polyvinyl acetate, ethylene propylene diene termonomer, ethylene vinyl acetate copolymer, ethylene-propylene copolymers, ethylene-propylene terpolymers, polybutenes. The binder may also be a wax.

In some embodiments, the battery may further include a lithiation control layer. For example, the polymer binder may form a film on the surface of the electrode to regulate the activation and lithiation rate of the electrode. The film formed by the polymer binder thus acts a pre-lithiation control layer, since lithium does not contact the electrode surface directly and lithiation is not likely to occur until electrolyte is added to the cell. The lithiation control layer may regulate lithium diffusion and slow the rate of dry state pre-lithiation that can occur during lamination of the lithium to the surface of the negative electrode and may subsequently allow for the dissipation of heat generation during storage of the electrode materials. One example of a lithium control layer is described in US Publication No. 2019/0229380 herein incorporated by reference in its entirety. Having a controlled rate of lithium diffusion increases the safety of pre-lithiation process due to a controlled heat dissipation.

The rheology modifier is selected so as to be compatible with the lithium metal powder and the polymer binder and dispersible in the composition. In one embodiment, the rheology modifier is carbon-based. For example, the rheology modifier may be comprised of carbon nanotubes to provide a structure for a coated electrode. In another embodiment, carbon black may be added as a rheology modifier.

A preferred embodiment of the printable lithium composition includes a carbon-based rheology modifier such as carbon nanotubes. Use of carbon nanotubes may also provide a three-dimensional support structure and conductive network for a lithium anode when coated with the printable lithium composition and increase its surface area. Another support structure may be one as described by Cui et al. [*Science Advances*, Vol. 4, no. 7, page 5168, DOI: 10.1126/sciadv.aat5168], incorporated herein by reference in its entirety, which uses a hollow carbon sphere as a stable host that prevents parasitic reactions, resulting in improved cycling behavior. Yet another support structure may be a nanowire as described in U.S. Pat. No. 10,090,512 incorporated herein by reference in its entirety. Other compatible carbon-based rheology modifiers include carbon black, graphene, graphite, hard carbon and mixtures or blends thereof.

Other examples of suitable rheology modifiers may include non-carbon-based materials, including titanium oxides and silicon oxides. For example, silicon nanostructures such as nanotubes or nanoparticles may be added as a rheology modifier to provide a three-dimensional structure and/or added capacity. The rheology modifiers may also increase the durability of the layer (i.e., coating, foil or film) formed from the printable lithium composition by preventing mechanical degradation and allow for faster charging.

Additional rheology modifiers may be added to the composition to modify properties such as viscosity and flow under shear conditions. The rheology modifier may also provide conductivity, improved capacity and/or improved stability/safety depending on the selection of the rheology modifier. To this end, the rheology modifier may be the combination of two or more compounds so as to provide different properties or to provide additive properties. Exemplary rheology modifiers may include one or more of silicon nanotubes, fumed silica, titanium dioxide, zirconium dioxide and other Group IIA, IIIA, IVB, VB and VIA elements/compounds and mixtures or blends thereof. Other additives intended to increase lithium ion conductivity can be used; for example, electrochemical device electrolyte salts such as lithium perchlorate ($LiClO_4$), lithium hexafluorophosphate ($LiPF_6$), lithium difluoro(oxalate)borate (LiDFOB), lithium tetrafluoroborate ($LiBF_4$), lithium nitrate ($LiNO_3$), lithium bis(oxalate) borate (LiBOB), lithium trifluoromethanesulfonimide (LiTFSI), lithium bis(fluorosulfonyl) imide (LiFSI). The additives included in the printable lithium formulation may also be selected to modify the porosity and overall three-dimensional support structure as desired. Examples may include carbon nanotubes (CNTs), graphene or polyacrylate as described in Electrochemical and Solid-State Letters, 12, 5, A107-A110, 2009.

Solvents compatible with lithium may include acyclic hydrocarbons, cyclic hydrocarbons, aromatic hydrocarbons, symmetrical ethers, unsymmetrical ethers, cyclic ethers, alkanes, sulfones, mineral oil, and mixtures, blends or cosolvents thereof. Examples of suitable acyclic and cyclic hydrocarbons include n-hexane, n-heptane, cyclohexane, and the like. Examples of suitable aromatic hydrocarbons include toluene, ethylbenzene, xylene, isopropylbenzene (cumene), and the like. Examples of suitable symmetrical, unsymmetrical and cyclic ethers include di-n-butyl ether, methyl t-butyl ether, tetrahydrofuran, glymes and the like. Commercially available isoparaffinic synthetic hydrocarbon solvents with tailored boiling point ranges such as Shell Sol® (Shell Chemicals) or Isopar® (Exxon) are also suitable.

The polymer binder and solvents are selected to be compatible with each other and with the lithium metal powder. In general, the binder or solvent should be non-reactive with the lithium metal powder or in amounts so that any reaction is kept to a minimum and violent reactions are avoided. The binder and solvent should be compatible with each other at the temperatures at which the printable lithium composition is made and will be used. Preferably the solvent (or co-solvent) will have sufficient volatility to readily evaporate from the printable lithium composition (e.g., in slurry form) to provide drying of the printable lithium composition (slurry) after application.

In another embodiment, a mixture of the polymer binder, rheology modifier, coating reagents, and other potential additives for the lithium metal powder may be formed and introduced to contact the lithium droplets during dispersion at a temperature above the lithium melting point, or at a lower temperature after the lithium dispersion has cooled such as described in U.S. Pat. No. 7,588,623 the disclosure of which is incorporated by reference in its entirety. The thusly modified lithium metal may be introduced in a dry powder form or in a solution form in a solvent of choice. It is understood that combinations of different process parameters could be used to achieve specific coating and lithium powder characteristics for particular applications.

The components of the printable lithium composition may be mixed together as a slurry or paste to have a high concentration of solid. Thus, the slurry/paste may be in the form of a concentrate with not all of the solvent necessarily added prior to the time of depositing or applying. In one embodiment, the lithium metal powder should be uniformly suspended in the solvent so that when applied or deposited a substantially uniform distribution of lithium metal powder is deposited or applied. Dry lithium powder may be dispersed such as by agitating or stirring vigorously to apply high sheer forces.

In another embodiment, a mixture of the polymer binder, rheology modifier, coating reagents, and other potential additives for the lithium metal powder may be formed and introduced to contact the lithium droplets during the dispersion at a temperature above the lithium melting point, or at a lower temperature after the lithium dispersion has cooled such as described in U.S. Pat. No. 7,588,623 the disclosure of which is incorporated by reference in its entirety. The thusly modified lithium metal may be introduced in a dry powder form or in a solution form in a solvent of choice. It is understood that combinations of different process parameters could be used to achieve specific coating and lithium powder characteristics for particular applications.

Conventional pre-lithiation surface treatments require compositions having very low binder content and very high lithium content; for example, see U.S. Pat. No. 9,649,688 the disclosure of which is incorporated by reference in its entirety. However, embodiments of the printable lithium composition in accordance with the present invention can accommodate higher binder ratios, including up to 20 percent on a dry basis. Various properties of the printable lithium composition, such as viscosity and flow, may be modified by increasing the binder and modifier content up to 50% dry basis without loss of electrochemical activity of lithium. Increasing the binder content facilitates the loading of the printable lithium composition and the flow during printing. The printable lithium composition may comprise between about 50% to about 98% by weight of lithium metal powder and about 2% to about 50% by weight of polymer binder and rheology modifiers on a dry weight basis. In one embodiment, the printable lithium composition comprises between about 60% to about 90% by weight lithium metal powder and between about 10% to about 40% by weight of polymer binder and rheology modifiers. In another embodiment the printable lithium composition comprises between about 75% to about 85% by weight of lithium metal powder and between about 15% to about 30% by weight of polymer binder and rheology modifiers.

An important aspect of printable lithium compositions is the rheological stability of the suspension. Because lithium metal has a low density of 0.534 g/cc, it is difficult to prevent lithium powder from separating from solvent suspensions. By selection of lithium metal powder loading, polymer binder and conventional modifier types and amounts, viscosity and rheology may be tailored to create the stable suspension of the invention. A preferred embodiment shows no separation at greater than 90 days. This may be achieved by designing compositions with zero shear viscosity in the range of $1\times10^4$ cps to $1\times10^7$ cps, wherein such zero shear viscosity maintains the lithium in suspension particularly when in storage. When shear is applied, the suspension viscosity decreases to levels suitable for use in printing or coating applications.

The resulting printable lithium composition preferably may have a viscosity at 10 s$^{-1}$ about 20 to about 20,000 cps, and sometimes a viscosity of about 100 to about 2,000 cps, and often a viscosity of about 700 to about 1,100 cps. At such viscosity, the printable lithium composition is a flowable suspension or gel. The printable lithium composition preferably has an extended shelf life at room temperature and is stable against metallic lithium loss at temperatures up to 60° C., often up to 120° C., and sometimes up to 180° C. The printable lithium composition may separate somewhat over time but can be placed back into suspension by mild agitation and/or application of heat.

In one embodiment, the printable lithium composition comprises on a solution basis about 5 to 50 percent lithium metal powder, about 0.1 to 20 percent polymer binder, about 0.1 to 30 percent rheology modifier and about 50 to 95 percent solvent. In one embodiment, the printable lithium composition comprises on a solution basis about 15 to 25 percent lithium metal powder, about 0.3 to 0.6 percent polymer binder having a molecular weight of 4,700,000, about 0.5 to 0.9 percent rheology modifier, and about 75 to 85 percent solvent.

In some embodiments, the lithium source is applied onto a surface of an anode to form a porous conductive layer on the surface during lithium diffusion. In some embodiments, the lithium source may be a lithium metal powder or a printable lithium composition. The printable lithium composition may have a slower lithium diffusion rate than other lithium sources during prelithiation due to the polymer layer applied to the surface during application of the printable lithium composition. In some embodiments, the rate of diffusion may decrease by about half for lithium deposited as a printable lithium composition. High heat generation caused by rapid diffusion in the dry state may damage the electrode or cause fires while the electrode roll is stored prior to slitting and final cell assembly. Thus, the slower diffusion rate may provide a safer prelithation process because of a slower rate of heat generated during the diffusion process thus more time for dissipation of heat.

Another aspect of the present invention is directed to a solid-state battery with a porous silicon anode lithiated with a printable lithium composition. A current collector, electrode and/or solid electrolyte of the solid-state battery may comprise a substrate coated with a printable lithium composition as described in U.S. application Ser. Nos. 16/573, 556, 16/359,733 and 16/573,587, all of which are herein incorporated by reference in their entireties.

In one embodiment, the battery may include a cathode, an electrolyte and a porous anode lithiated with the printable lithium composition. The electrolyte may have a concentration of above 1 M, often equal to about 3 M or higher, and sometimes above 5 M. Examples of suitable electrolytes include lithium perchlorate ($LiClO_4$), lithium hexafluorophosphate ($LiPF_6$), lithium difluoro(oxalate)borate (LiDFOB), lithium tetrafluoroborate ($LiBF_4$), lithium nitrate ($LiNO_3$), lithium bis(oxalate) borate (LiBOB), lithium bis(fluorosulfonyl) imide (LiFSI) and lithium trifluoromethanesulfonimide (LiTFSI) and mixtures or blends thereof. One exemplary example is a battery having a cathode and a porous anode lithiated with a printable lithium composition and a high concentration electrolyte, wherein LiFSI is the major salt of the high concentration electrolyte. Another example is a battery having a cathode and a porous anode lithiated with a printable lithium composition and a dual-salt liquid electrolyte as described by Weber et al [Nature Energy, Vol. 4, pgs. 683-689 (2019), DOI: 10.1038/s41560-019-0428-9] and US Publication No. 2019/0036171, both of which are incorporated herein by reference. The dual-salt liquid electrolyte may be comprised of lithium difluoro (oxalate)borate (LiDFOB) and $LiBF_4$, and may have a concentration of about 1 M. Dual-salt electrolytes may provide increased initial capacity retentions and improved cycle performance.

The current collector material may be a foil, mesh or foam. For example, the anode material may comprise graphite, hard carbon, graphite-SiOx composite, SiOx, SiO, $SiO_2$, SiC, Si, Si/C composite, Si-based alloys, graphite-SnO, Sn/C composite, and other lithium ion battery and lithium ion capacitor anode materials. Since it has hole across the substrate, mesh is used to improve the energy density of the batteries by reducing the weight of current collector. Foam may also be used as a current collector. Continuous 3D-form can provide a special porous structure which will help to accommodate more $Li^+$, hence hindering the growth of Li dendrites, improving the rate capability and extending the cycle life.

In one embodiment, the active anode material and the printable lithium composition are provided together and extruded onto the current collector (e.g., copper, nickel, etc.). For instance, the active anode material and printable lithium composition may be mixed and co-extruded together. Examples of active anode materials include graphite, graphite-SiO, graphite-SnO, SiO, hard carbon and other lithium ion battery and lithium ion capacitor anode materials. In another embodiment, the active anode material and the printable lithium composition are co-extruded to form a layer of the printable lithium composition on the current collector. The deposition of the printable lithium composition including the above extrusion technique may include depositing as wide variety patterns (e.g., dots, stripes), thicknesses, widths, etc. For example, the printable lithium composition and active anode material may be deposited as a series of stripes, such as described in US Publication No. 2014/0186519 incorporated herein by reference in its entirety. The stripes would form a 3D structure that would account for expansion of the active anode material during lithiation. For example, silicon may expand by 300 to 400 percent during lithiation. Such swelling potentially adversely affects the anode and its performance. By depositing the printable lithium as a thin stripe in the Y-plane as an alternating pattern between the silicon anode stripes, the silicon anode material can expand in the X-plane alleviating electrochemical grinding and loss of particle electrical contact. Thus, the printing method can provide a buffer for expansion. In another example, where the printable lithium formulation is used to form the anode, it could be co-extruded in a layered fashion along with the cathode and separator, resulting in a solid-state battery.

In additional embodiments, at least a portion of the printable lithium composition can be supplied to the anode active material prior to the formation process of the battery. For example, the anode may comprise a partially lithium-loaded silicon-based active material as described in US Publication No. 2018/0269471 herein incorporated by reference in its entirety, in which the partially loaded active material has a selected degree of loading of lithium through intercalation/alloying or the like. In some embodiments, the anode active material may be mechanically lithiated with a printable lithium composition. For example, the anode active material may be pressed with force selected to induce mechanical lithiation once a printable lithium composition is applied on its surface.

In one embodiment, the printable lithium composition may be incorporated into a three-dimensional electrode structure as described in US Publication No. 2018/0013126 herein incorporated by reference in its entirety. For example, the printable lithium composition may be incorporated into a three-dimensional porous anode, porous current collector or porous polymer or ceramic film, wherein the printable lithium composition may be deposited therein. The printable lithium composition may be incorporated into a solid electrolyte, wherein the solid electrolyte may be combined with or applied to a lithium metal anode to form a composite anode. The solid electrolyte may be applied as one or more interface ion conductive electrolyte layers or interfaces to the lithium metal anode. One example is described in U.S. Pat. No. 8,182,943 herein incorporated by reference in its entirety.

In another embodiment, the printable lithium composition may be incorporated into a three-dimensional electrode structure as described in US Publication No. 2018/0013126 herein incorporated by reference in its entirety. The three-dimensional electrode may be a permeable composite material comprised of a support defining pores and an alkali metal deposit on the support, wherein the alkali metal is deposited using a printable lithium composition. The three-dimensional electrode may have a porosity between about 1% by volume to about 95% by volume, and may have a mean flow pore size in the range of from about 1 nm to about 300 μm.

Another embodiment of the battery may include a composite anode formed using a pulsed electron beam as described in U.S. Pat. No. 10,047,432 herein incorporated by reference in its entirety. For example, the pulsed electron beam may be used as a virtual cathode deposition (VCD) process applied to an anode material, wherein a three-dimensional porous anode structure is created using the electron beam. The three-dimensional structure formed from the pulsed electron beam may be a carbon allotrope for lithium ion batteries (CALIB). The CALIB structure may be deposited with lithium using a printable lithium composition to form a carbon polymorph.

In some embodiments, an electrode prelithiated with the printable lithium composition can be assembled into a cell with the electrode to be preloaded with lithium. A separator can be placed between the respective electrodes. Current can be allowed to flow between the electrodes. For example, an anode prelithiated with the printable lithium composition of the present invention may be formed into a second battery such as described in U.S. Pat. No. 6,706,447 herein incorporated by reference in its entirety.

The cathode is formed of an active material, which is typically combined with a carbonaceous material and a binder polymer. The active material used in the cathode is preferably a material that can be lithiated. Preferably, non-lithiated materials such as $MnO_2$, $V_2O_5$, $MoS_2$, metal fluorides or mixtures thereof, Sulphur and sulfur composites can be used as the active material. However, lithiated materials such as $LiMn_2O_4$ and $LiMO_2$ wherein M is Ni, Co or Mn that can be further lithiated can also be used. The non-lithiated active materials are preferred because they generally have higher specific capacities, lower cost and broader choice of cathode materials in this construction that can provide increased energy and power over conventional secondary batteries that include lithiated active materials.

For example, the printable lithium composition may be used to form a monolithic lithium metal anode of various thicknesses and widths for use in a solid-state battery, including solid-state batteries as described in U.S. Pat. Nos. 8,252,438 and 9,893,379 and incorporated herein by reference in their entireties. In yet another embodiment, the printable lithium composition may be applied or deposited so as to form a solid electrolyte for a solid-state battery, and includes combining the printable lithium composition with a polymer or ceramic material to form a solid electrolyte.

The surfaces of typical solid electrolytes may be rough depending on the solid electrolyte selection and therefore may not form good contacts between the solid electrolyte and the lithium (foil) anode, leading to a sub-optimal interface and reduced battery performance. In one embodiment, the printable lithium composition may be used to prelithiate a solid electrolyte, forming an interface layer that improves the solid electrolyte surface and therefore provides for improved adhesion with a lithium anode. In another embodiment, the interface layer may comprise a foil or film formed from a printable lithium composition. The printable lithium composition forming the interface layer may be applied to various types of solid electrolytes, including polymer, glass, and ceramic electrolytes. Having a modified solid electrolyte surface optimizes contact between the solid electrolyte and a lithium anode, resulting in an improved interface between the solid electrolyte and lithium anode and leading to better battery performance by lessening the impedance growth caused by loss of contact between lithium and the electrolyte that occurs because of volume increase of the lithium during cycling.

Another example of a solid-state secondary battery may include a cathode capable of electrochemically absorbing and desorbing lithium; an anode capable of electrochemically absorbing and desorbing lithium, the anode including an active material layer that comprises an active material, the active material layer being carried on a current collector; and a non-aqueous electrolyte as described in U.S. Pat. No. 7,914,930 herein incorporated by reference in its entirety. A method includes the steps of: reacting lithium with the active material of the anode by bringing the printable lithium composition into contact with a surface of the active material layer of the anode; and thereafter combining the anode with the cathode to form an electrode assembly.

EXAMPLES

Example 1

17 g artificial graphite, 2 g SiO and 12.5 g of 8% styrene butadiene rubber in toluene are combined with 8.5 g toluene in a 250 ml polypropylene cup. The mixture is blended at 1000 rpm for 3 minutes in a THINKY ARE 250 planetary centrifugal mixer creating a uniform anode slurry. 0.85 g of stabilized lithium metal powder (SLMP®, FMC USA Lithium Corp.) or PLF with equivalent lithium metal content is added to the slurry and blended in the THINKY for 30 seconds at 1000 rpm. The resulting slurry is coated on copper foil using a 6 mil doctor blade. The solvent is dried using a forced hot air dryer at 110° C. until all solvent is removed. The dried electrode is pressed using at 30 μm gap roll press. A 4 cm×4 cm piece of the pressed electrode is placed into a sealed pouch with 1 g of 1M $LiPF_6$ in EC/DEC 1:1 electrolyte and observed under a digital microscope. After diffusion of lithium there is an increase in porosity of 33.6% to 35.2% (an increase of about 5%). This is estimated based upon the thickness and true density of the materials. Theoretical density is calculated by subtracting the contribution of lithium from the true density of each component, based on the assumption that all lithium is intercalated into the host anode material and that after diffusion pores would be left where lithium particles once resided.

Example 2

Anode electrodes from LiFun Technologies are used to test the effectiveness of printable lithium formulation to increase first cycle efficiency (FCE). Electrodes containing 10% SiO are used for testing. The formulation for 10% SiO anode electrode comprises 85.32% artificial graphite+9.48% SiO, 3.8% binder (CMC+SBR) and 1.4% carbon black. The loading of the anode materials is 8.2 mg/cm$^2$ and the press density is about 1.5 g/cm$^3$. The size of the electrode is 7 cm×7 cm. This anode electrode has an FCE of 85% when tested in a half cell with a lithium metal counter electrode.

Printable lithium formulation (PLF) containing 6 mg of stabilized lithium metal powder (SLMP®, FMC USA Lithium Corp.) is applied to the surface of the 10% SiO electrode. After drying and pressing, the electrode is assembled into a half cell in the pouch cell format with lithium metal counter electrode using 1M LiPF$_6$ in EC:FEC:EMC:DMC 1:1:2:6 (volume ratio) electrolyte. The cell is tested with the following protocol on a Maccor series 4000 cycler: Rest 24 hrs @ 45° C., then 1 Cycle conducted at the following condition: 1) discharge at 0.1 C to 0.005V, 2) a constant voltage step until current drop to 0.05 C, 3) charge at 0.1 C to 1.5V. The first cycle efficiency is increased from 85.59% to 97.32% (Table 1). FIGS. 1A and 1B show the as-printed, dried and pressed formulation on the surface of the 10% SiO containing graphite electrode and the resulting increase in surface porosity after lithium diffusion.

TABLE 1

Performance comparison for Graphite-10% SiO/Li vs. Graphite-10% SiO-PLF/Li cells

|  | Baseline cell | Cell incorporating PLF | Performance improvement |
| --- | --- | --- | --- |
| First cycle efficiency, % | 85.59 | 97.32 | 11.73% |

Example 3

Baseline (BL) and cells containing PLF-incorporated electrodes single-layer pouch cells are made with NMC 811 cathode and Graphite −10% SiO with Celgard 3501 separator. 1 g of 1M LiPF$_6$ in 1:1:2:6 Vol EC:FEC:EMC:DMC electrolyte is used. Cells are cycled using the formation protocol of a 24-hour rest period at a temperature of 45° C., followed by charging at the constant current of 10 mA to 4.2V and then discharging at the constant current of 10 mA to 2.8V with a current cutoff of 5 mA. The cells are charged to 3.8V after formation step for impedance measurements. Following initial impedance test, the cells are tested for rate capability.

TABLE 2

Impedance Measurements for PLF-incorporated and Baseline Cells

| Cell ID | Impedance Measurement after Formation step (ohm) | Impedance Measurement at 80% Capacity Retention (ohm) |
| --- | --- | --- |
| PLF Cell-1 | 0.502 | 0.447 |
| PLF Cell-2 | 0.429 | 0.352 |
| PLF Cell-3 | 0.437 | 0.343 |

TABLE 2-continued

Impedance Measurements for PLF-incorporated and Baseline Cells

| Cell ID | Impedance Measurement after Formation step (ohm) | Impedance Measurement at 80% Capacity Retention (ohm) |
| --- | --- | --- |
| PLF Cell-4 | 0.436 | 0.389 |
| PLF Cell-5 | 0.510 | 0.555 |
| Baseline Cell-1 | 0.572 | 0.525 |
| Baseline Cell-2 | 0.534 | 0.476 |
| Baseline Cell-3 | 0.527 | 0.528 |
| Baseline Cell-4 | 0.526 | 0.489 |
| Baseline Cell-5 | 0.527 | 0.504 |
| PLT Avg. | 0.463 ± 0.040 | 0.417 ± 0.087 |
| BL Avg. | 0.537 ± 0.020 | 0.504 ± 0.023 |

Surface porosity for the PLF cells is about 50% prior to lithium diffusion. Lithium represents about 84% of the volume of the PLF treatment solution. After lithium diffusion, the surface porosity is about 88.5% and the porosity of the bulk is 34%. Increased porosity at the surface provides increased surface area for electrolyte absorption and therefore faster lithium ion diffusion kinetics. Faster diffusion kinetics results in lower charge transfer impedance and provides better charge rate capabilities. When comparing total impedance of Graphite-10% SiO full cells, there is a 14% reduction in cells treated with PLF versus baseline cells. Furthermore, at the end of cycle life there is about a 16% reduction in total impedance for cells with electrodes treated with PLF vs baseline cells. There is about a 9% improvement in rate capability at a 1 C charge rate and about a 36% improvement at a 2 C charge rate.

Standard batteries require several days to form a good SEI layer on the surface anode materials. However, SEI formation time is significantly decreased when treating electrodes with a printable lithium composition. FIGS. 2A-C are plots comparing gas generation for between baseline and PLF-treated NMC811/Graphite-5% SiO pouch cells during a) 24 hours rest at 60° C.; b) first two formation cycles and c) cycling at room temperature. Gas generation is indicative of SEI formation. As seen in FIGS. 2A-C, PLF-incorporated cells produced the most gas during 24 hours rest at 60° C. In contrast, baseline cells produced no gas during the same period of rest time. FIGS. 2A-C demonstrate the PLF-incorporated cells are capable of producing a SEI layer within a shorter period of time compared to baseline cells.

FIG. 2B shows the gas production differences between baseline and PLF-incorporated NMC811/Graphite-5% SiO pouch cells during the first 2 cycles. PLF-incorporated cells produced almost no gas while baseline cells produced gas during the formation cycle. This is because the SEI formation for baseline cells occurs below 3V where most of the solvent is reduced on anode surface. In contrast, PLF-incorporated cells form the SEI layer during the 24 hours rest period and therefore no formation cycle is needed to form SEI layers with PLF-treated cells.

FIG. 2C shows gas production comparison between baseline and PLF-incorporated NMC811/Graphite-5% SiO pouch cells during 10 rate cycling at room temperature (RT) measured at the end of cycle life (20% capacity loss). Both baseline and PLF-incorporated cells produced a similar volume of gas.

Gas is generated during the SEI formation cycle due to solvent reduction during the formation of the SEI layer. PLF-incorporated cells generate gas during the rest step and generate minimal gas during formation.

When comparing the rate at which lithium diffuses into silicon containing anode material during the prelithiation process, PLF diffusion rate is 30% slower than when using SLMP alone. The diffusion rate is slowed by the polymer layer applied to the surface of the anode during PLF application. This slower diffusion rate can result in controlled heat dissipation during the diffusion process and leads to a safer prelithiation process. Furthermore, during dry state diffusion stage before electrolyte addition, it has been observed that PLF diffusion is minimal compared to use of dry SLMP. This property leads to less heat generation due to lithium diffusion after lamination of PLF to the electrode surface. Heat generation due to dry state lithium diffusion in electrode rolls during storage has been observed to generate heat sufficient to damage the electrode films or even cause thermal event while the electrode rolls are stored prior to being used in cell assembly processes.

FIG. 3 shows a comparison of the diffusion rate of lithium, deposited as SLMP compared to the diffusion rate of lithium deposited as a printable lithium composition, into a SiO anode material in the dry state. The electrodes are treated with either SLMP or PLF at a loading equal to about 0.7 mg/cm² lithium, a quantity sufficient to compensate the irreversible capacity. The electrodes are then pressed with force selected to induce mechanical lithiation. The test results show that the diffusion rate of lithium deposited using PLF is significantly slower than that of SLMP.

FIG. 4 shows the differential capacity (dQ/dV) versus potential (V) curves for baseline cells and PLF-incorporated cells. As seen in FIG. 4, the baseline cells have a pronounced peak at 2.7V, which is due to the reduction of Fluoroethylene Carbonate on the graphite surface, and a peak at 2.9 V, which is due to the well-known reduction of Ethylene Carbonate on anode surface. See Wang et al. [*Journal of The Electrochemical Society.* 161 (2014) 467-472 DOI: 10.1149/2.001404jes] and Xia et al. [*Journal of Power Sources.* 328 (2016) 124-135. DOI: 10.1016/j.jpowsour.2016.08.015] for further discussions regarding solvent reduction peaks, both of which are herein incorporated by reference in their entireties.

In contrast, FIG. 4 shows that PLF-treated cells have no solvent reduction peaks at all during the formation cycle before 2.9 V. This is because pre-lithiation treatment results in partial charging of the cell higher than 2.9 V. This voltage is beyond the voltage of solvent reduction, indicating that direct anode contacts with Li metal initiates SEI layer formation during the pre-lithiation process.

FIGS. 5A and 5B compare the AC impedances between baseline and PLF-incorporated NMC811/Graphite-5% SiO pouch cells measured after two formation cycles and after cycling. AC impedance spectra are collected with ten points per decade from 100 kHz to 100 mHz with a signal amplitude of 10 mV using a Gamry Potentiostats (Reference 3000™). FIGS. 5A and 5B show PLF-incorporated cells have significantly lower impedance after formation and during cycling, indicating that treating cells with printable lithium compositions may improve the rate performance. As reported in Table 1, PLF-incorporated cells may have an improved cycle efficiency compared to baseline lithium ion cell.

TABLE 4

Test results for baseline and PLF incorporated cells

| Cell chemistry | | Thickness as assembled (mm) | Thickness after formation (mm) | First CE (%) | Volumetric energy density (Wh/L) | Gravimetric energy density (Wh/kg) |
|---|---|---|---|---|---|---|
| NMC811/5% SiO + 95% Graphite | Baseline | 3.16 | 3.27 | 80.5 | 451 | 213 |
| | PLF incorporated | 3.31 | 3.29 | 87.7 | 494 | 235 |
| | % increase | 4.70 | 0.60 | 7.2 | 10.80 | 10.10 |

Table 4 compares various features between baseline cells and printable lithium incorporated cells. There is about a 5% thickness increase after cell assembly in NMC811/Graphite-5% SiO for PLF incorporated cells versus baseline cells. Each double side treated anode electrode has about a 10 μm thickness increase, thus the 10-layer cells have about 100 μm total increase in thickness as assembled. However, during formation, all deposited lithium will intercalate into the bulk of the anode resulting in no apparent thickness change between treated and baseline pouch cells. The cell volume measurements indicate no increase after formation as well. There is an increase in first cycle discharge capacity resulting in 7% higher first cycle efficiency for the cells incorporating anodes treated with a printable lithium composition. The volumetric and gravimetric energy density increased about 11% and 10%, respectively, for the PLF-incorporated cells.

The gas production data in FIGS. 2A-C and the voltage data in FIG. 4 indicate that the SEI layer for PLF-incorporated cells is being formed during the rest step. The benefit is that the formation cycle for PLF-incorporated cells may be eliminated or drastically reduced.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

That which is claimed is:

1. A battery comprising:
   a cathode; and
   an anode comprised of an anode active material and lithiated with a lithium source; wherein the anode active material is alloyed or intercalated with lithium particles diffused from the lithium source to form a three-dimensional porous framework within the anode that provides reduced electrode deterioration due to volume expansion, has a gradient porosity to increase lithium conductivity and to mitigate lithium plating and to enable fast charging of the battery, and provides an anode having a first cycle efficiency of greater than about 90%.

2. The battery of claim 1, wherein the anode active material has a porosity between about 25% and about 60%.

3. The battery of claim 2, wherein the porosity of the anode active material is increased between about 1% and about 10% when alloyed or intercalated with lithium particles diffused from the lithium source to form the three-dimensional porous framework within the anode.

4. The battery of claim 1 further including a lithiation control layer on a surface of the anode adapted to control an activation rate and a pre-lithiation rate of the anode.

5. The battery of claim 4, wherein the lithiation control layer is a film on the surface of the anode formed from a polymer binder and is adapted to slow diffusion of lithium onto the surface.

6. The battery of claim 1, wherein the surface of the anode has a porosity greater than about 40%.

7. The battery of claim 1, wherein the gradient porosity has an increased surface area for lower charge transfer impedance and increased charge rate capabilities.

8. The battery of claim 1, wherein the lithium source is stabilized lithium metal powder.

9. The battery of claim 1, wherein the lithium source comprises a printable lithium formulation comprised of a lithium metal powder, a polymer binder compatible with the lithium metal powder, a rheology modifier compatible with the lithium metal powder, and a solvent compatible with the lithium metal powder and with the polymer binder.

10. The battery of claim 9, wherein the rheology modifier is selected from the group consisting of carbonaceous materials, silicon-containing materials, tin-containing materials, Group IIA oxides, Group IIIA oxides, Group IVB oxides, Group VB oxides and Group VIA oxides.

11. The battery of claim 10, wherein the carbonaceous material is selected from the group consisting of carbon black, carbon nanotubes, graphite, hard carbon, and graphene.

12. The battery of claim 10, wherein the silicon-containing material is selected from the group consisting of silicon nanotubes and fumed silica.

13. The battery of claim 9, wherein the polymer binder has a molecular weight of 1,000 to 8,000,000 and is selected from the group consisting of unsaturated elastomers, saturated elastomers, and thermoplastics.

14. The battery of claim 9, wherein the solvent is selected from the group consisting of alkanes, toluene, ethyl benzene, cumene, xylene, sulfones, mineral oil, glymes, and isoparaffinic synthetic hydrocarbon solvents.

15. The battery of claim 14 further including an artificial solid electrolyte interface layer on a surface of the anode.

16. The battery of claim 15, wherein the artificial solid electrolyte interface is formed from a polymer binder and a lithium ion conducting additive.

17. The battery of claim 16, wherein the lithium ion conducting additive comprises one or more solid electrolyte salts selected from the group comprising sulfides, oxides, phosphates, and argyrodite-type electrolytes.

18. A battery comprising:
a cathode; and
an anode having a porous surface comprised of an anode active material and lithiated with a lithium source; wherein the anode active material is alloyed or intercalated with lithium particles diffused from the lithium source to form a three-dimensional porous framework having—a gradient porosity—within the anode that provides reduced electrode deterioration due to volume expansion, provides increased lithium conductivity, and mitigates lithium plating.

19. The battery of claim 18, wherein the anode active material has a porosity between about 25% and about 60%.

20. The battery of claim 19, wherein the porosity of the anode active material is increased between about 1% and about 10% when alloyed or intercalated with lithium particles diffused from the lithium source to form the three-dimensional porous framework within the anode.

21. The battery of claim 18, wherein the lithium source is stabilized lithium metal powder.

22. The battery of claim 18, wherein the lithium source comprises a printable lithium formulation comprised of a lithium metal powder, a polymer binder compatible with the lithium metal powder, a rheology modifier compatible with the lithium metal powder, and a solvent compatible with the lithium metal powder and with the polymer binder.

23. The battery of claim 22, wherein the rheology modifier is selected from the group consisting of carbonaceous materials, silicon-containing materials, tin-containing materials, Group IIA oxides, Group IIIA oxides, Group IVB oxides, Group VB oxides and Group VIA oxides.

24. The battery of claim 23, wherein the carbonaceous material is selected from the group consisting of carbon black, carbon nanotubes, graphite, hard carbon, and graphene.

25. The battery of claim 23, wherein the silicon-containing material is selected from the group consisting of silicon nanotubes and fumed silica.

26. The battery of claim 22, wherein the solvent is selected from the group consisting of alkanes, toluene, ethyl benzene, cumene, xylene, sulfones, mineral oil, glymes, and isoparaffinic synthetic hydrocarbon solvents.

* * * * *